United States Patent
Lee et al.

(10) Patent No.: US 11,170,186 B2
(45) Date of Patent: Nov. 9, 2021

(54) SCANNER BAR

(71) Applicant: NCR Corporation, Atlanta, GA (US)

(72) Inventors: Kwan Woo Lee, Johns Creek, GA (US); Peter B. Barron, Tucker, GA (US); Joshua Bryan Minter, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 103 days.

(21) Appl. No.: 16/370,015

(22) Filed: Mar. 29, 2019

(65) Prior Publication Data
US 2020/0311360 A1   Oct. 1, 2020

(51) Int. Cl.
| G06K 7/10 | (2006.01) |
| G06Q 20/18 | (2012.01) |
| G06Q 20/20 | (2012.01) |
| G06K 7/14 | (2006.01) |

(52) U.S. Cl.
CPC ....... *G06K 7/10722* (2013.01); *G06K 7/1413* (2013.01); *G06Q 20/18* (2013.01); *G06Q 20/208* (2013.01)

(58) Field of Classification Search
CPC ............ G06K 7/10722; G06K 7/1413; G06Q 20/208; G06Q 20/18
See application file for complete search history.

(56) References Cited

U.S. PATENT DOCUMENTS

| 6,236,736 | B1 * | 5/2001 | Crabtree | G01S 3/7865 |
| | | | | 235/383 |
| 2002/0056750 | A1 * | 5/2002 | Kato | G06K 7/10861 |
| | | | | 235/454 |
| 2006/0043194 | A1 * | 3/2006 | Barkan | G06K 7/10722 |
| | | | | 235/462.45 |
| 2006/0048800 | A1 * | 3/2006 | Rast | G06F 1/3265 |
| | | | | 134/56 R |
| 2008/0179402 | A1 * | 7/2008 | Barkan | G06K 7/10722 |
| | | | | 235/462.41 |
| 2011/0073656 | A1 * | 3/2011 | Detwiler | G06K 7/10722 |
| | | | | 235/462.41 |
| 2012/0024952 | A1 * | 2/2012 | Chen | G06K 7/10722 |
| | | | | 235/454 |
| 2012/0193421 | A1 * | 8/2012 | Sauerwein, Jr. | G06K 7/1408 |
| | | | | 235/455 |

(Continued)

OTHER PUBLICATIONS

B. Wu, W. Tseng, Y. Chen, S. Yao and P. Chang, "An intelligent self-checkout system for smart retail," 2016 International Conference on System Science and Engineering (ICSSE), Puli, 2016. (Year: 2016).*

(Continued)

*Primary Examiner* — Nathan A Mitchell (74) *Attorney, Agent, or Firm* — Schwegman, Lundberg & Woessner (57) ABSTRACT

Disclosed is a scanner. The scanner may include an enclosure, a first camera, and a second camera. The enclosure may define a first opening and a second opening. The first camera may be arranged to capture first images exterior to the enclosure via the first opening. The second camera may be arranged to capture second images exterior to the enclosure via the second opening. The first images and the second images may be of a product passing through a field of view defined by the first camera and the second camera.

14 Claims, 4 Drawing Sheets

(56) References Cited

U.S. PATENT DOCUMENTS

| | | | | |
|---|---|---|---|---|
| 2013/0292470 | A1* | 11/2013 | Shearin | G06K 7/10722 235/437 |
| 2015/0193780 | A1* | 7/2015 | Migdal | G06Q 30/018 705/317 |
| 2016/0171456 | A1* | 6/2016 | Bowles | G06Q 30/0278 705/23 |
| 2016/0292661 | A1* | 10/2016 | Kwan | H04N 7/181 |
| 2018/0240090 | A1* | 8/2018 | Yokoyama | G06Q 20/202 |
| 2018/0240092 | A1* | 8/2018 | Miyagi | G06Q 20/18 |
| 2018/0240126 | A1* | 8/2018 | Miyagi | G06K 9/00771 |
| 2018/0276456 | A1* | 9/2018 | Miyagi | G06K 7/10722 |
| 2019/0188513 | A1* | 6/2019 | Beghtol | G06K 9/42 |
| 2019/0220692 | A1* | 7/2019 | Wu | G06K 9/32 |
| 2020/0202094 | A1* | 6/2020 | D'Ercoli | G06K 7/1456 |

OTHER PUBLICATIONS

Mumani, A., Stone, R., & Wang, Z. The Effect of Scanning Technology and UPC Placement on Supermarket Self-Checkout. Packaging Technology and Science, 31. 2018. (Year: 2018).*

Bobbit, R., Connell, J., Haas, N., Otto, C., Pankanti, S. & Payne, J. (2011). Visual item verification for fraud prevention in retail self-checkout. In IEEE workshop on applications of computer vision (WACV) (pp. 585-590). (Year: 2011).*

* cited by examiner

SCANNER BAR

SUMMARY

Disclosed is a scanner. The scanner may include an enclosure, a first camera, and a second camera. The enclosure may define a first opening and a second opening. The first camera may be arranged to capture first images exterior to the enclosure via the first opening. The second camera may be arranged to capture second images exterior to the enclosure via the second opening. The first images and the second images may be of a product passing through a field of view defined by the first camera and the second camera.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Disclosed herein is a scanner bar that may include a simple, compact, and cost-effective design that may allow the scanner bar to be leveraged and integrated with self-service terminals or cashier assisted terminal solutions without difficulty. This is achievable due to the compact and innovative design of the scanner bar.

As disclosed herein, scanner bars may include a modular design that allows for the scanner bar to be fabricated as multiple components. The multiple components may allow for easy installation and maintenance as parts can easily be serviced or replaced without a need to completely disassemble or otherwise uninstall the entire scanner bar.

The scanner bars disclosed herein may include multiple cameras. Each of the cameras may have a field of view. The field of view from the cameras may overlap in a manner that defines an overall field of view for the scanner bar. The cameras may be optical cameras so that they can capture images of a product as the product passes through the field of view.

During a checkout operation, the product may be passed from a cart, through the field of view of two or more cameras, and into a bagging area. As the product passes from the cart and into the field of view, a first camera may collect a first set of images of the product. As the product continues through the field of view and into the bagging area, a second camera may collect a second set of images.

Using object tracking, the product can be tracked as it passes through the field of view. Tracking the product may allow store personnel and the self-service terminal to determine if a product that is scanned is then placed in the bagging area or if a customer or store employee is trying to switch products in an attempt to steal or otherwise defraud a store. As the product is tracked, various light indicators, such as LED lights associated with the scanner bar may illuminate to notify a customer and store personnel that the product has scanned correctly and was placed in the bagging area.

Figure 1:
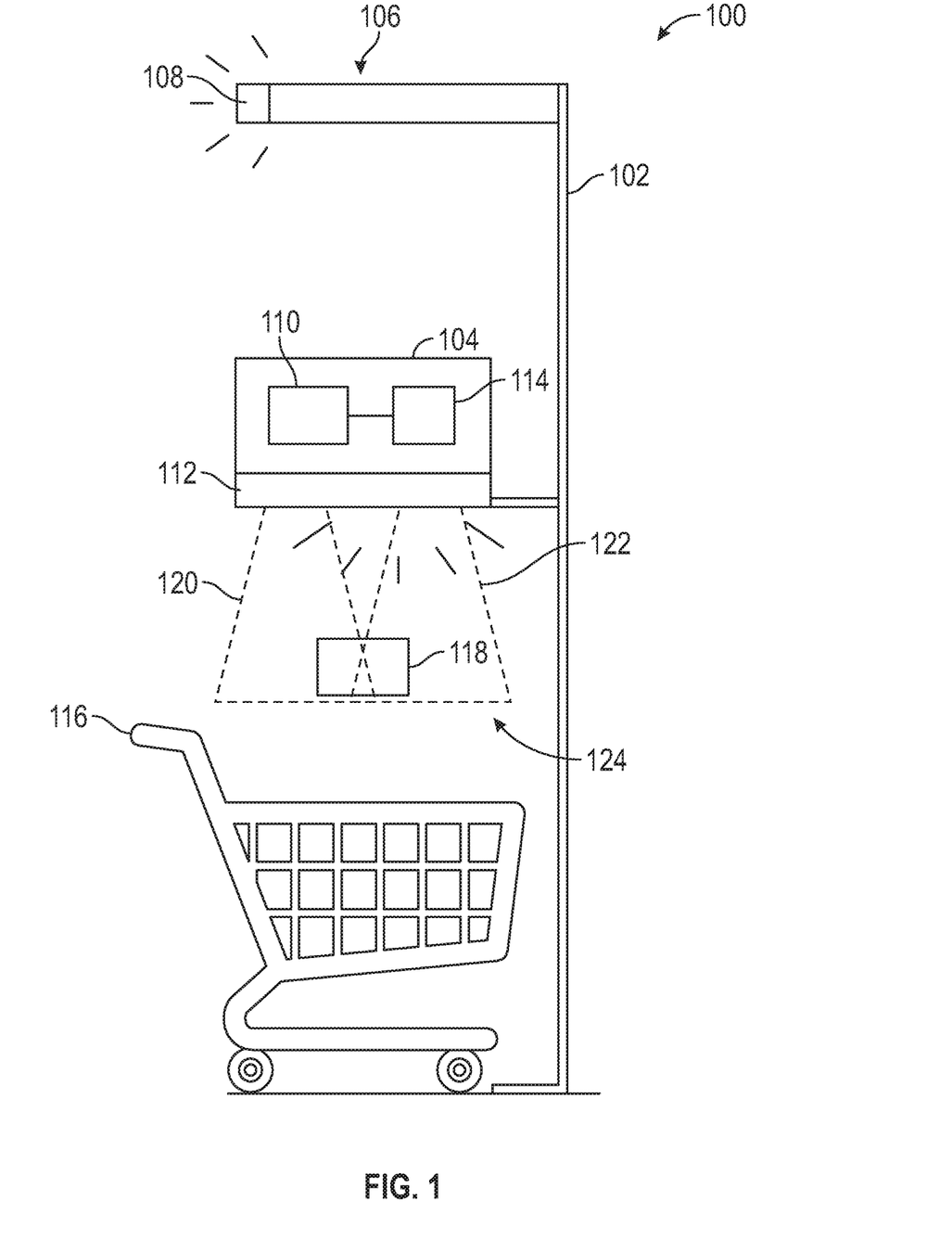
FIG. 1 shows an example self-service terminal consistent with this disclosure.

Turning now to the figures, FIG. 1 shows an example self-service terminal 100 consistent with this disclosure. As shown in FIG. 1, self-service 100 may include a stand 102 that may support a housing 104 and an indicator light 106, which may include an LED light 108. Housing 104 may include a display 110 and a scanner bar 112 that each may be electrically coupled to a computing device 114.

As disclosed herein, scanner bar 112 may include one or more cameras that can be used to capture images of products as they are moved from cart 116 to a bagging area or back to cart 116 after being scanned. As the products are being scanned, scanner bar 112 may capture images of the product that may include a barcode on the packaging of the products. For example, a customer using the self-service terminal 100, or a cashier if self-service terminal 100 is configured in a cashier-assist manner, may pass a product 118 underneath scanner bar 112 with a barcode facing up so that the cameras within scanner bar 112 can capture images of the barcode.

This is one advantage of scanner bar 112 over conventional laser based scanners currently used. Using conventional scanners, the user would rotate package 116 to find the barcode and then have to further rotate product 118 to orient the barcode towards the scanner, which usually means rotating the barcode way from the user and out of his or her sight. Using scanner bar 112, instead of the user having to orient the packaging so that the barcode is facing away from the user and towards a scanner, the user can simply find the barcode and pass it underneath scanner bar 112 without further rotations or manipulation of the product. This leads to fast checkout times due to the increase in efficiency by not having to further orient products after locating a barcode.

As disclosed herein, as product 118 passes underneath scanner bar 112, images of product 118 may be collected and received by computing device 114. Computing device 114 may use the images to track movement of product 118. Once product 118 is scanned and placed back in cart 116 or in a bagging area, computing device 114 may activate LED lights 108 to signal product 118 has been scanned correctly. For example, computing device 114 may track product 118 and when product 118 is scanned and placed back in cart 116, LED lights 108 may illuminate green to signify product 118 was scanned correctly and placed back in cart 116. If product 118 does not scan correctly, LED lights 108 may illuminate red to signify product 118 did not scan correctly or that the product placed in cart 116 was not product 118. For instance, if a customer scans one product, such as product 118 and tries to place a different product, such as a more expensive product, in cart 116, LED lights 108 may illuminate red to notify store personnel.

Figure 2A:
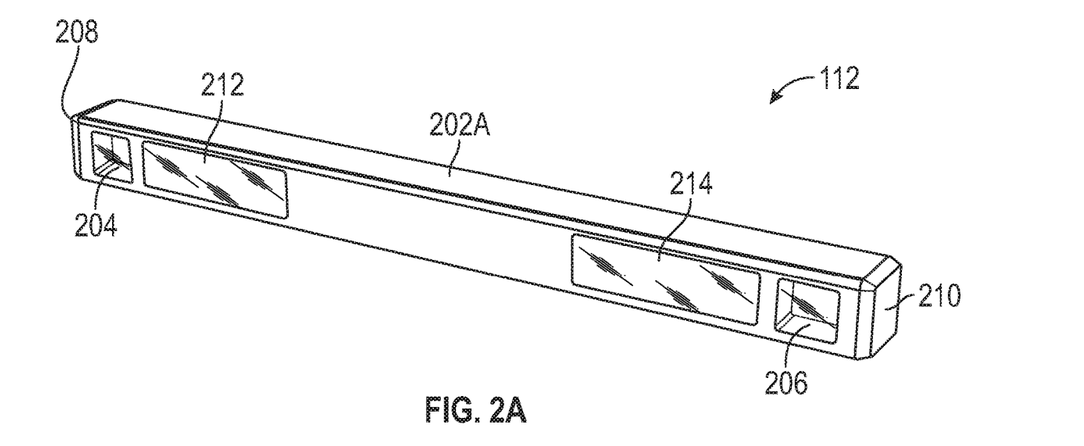
FIGS. 2A and 2B show an example scanner bar consistent with this disclosure.
Figure 2B:
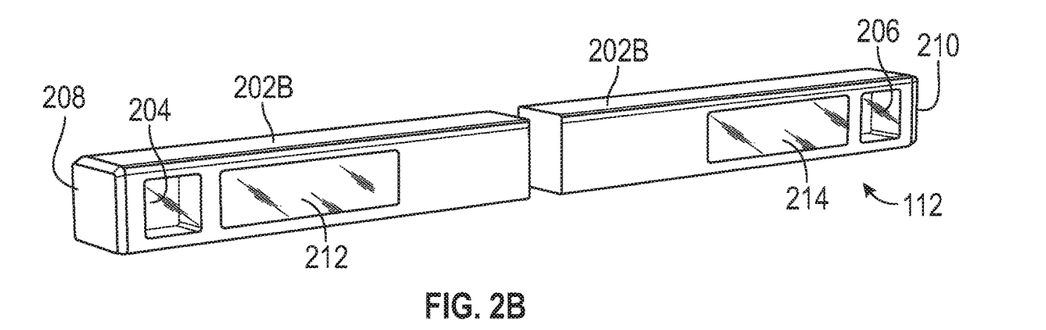

FIGS. 2A and 2B shows scanner bar 112 consistent with this disclosure. As shown in FIGS. 2A and 2B, scanner bar 112 may include an enclosure 202A in FIG. 2A and 202B in FIG. 2B, which may define a first opening 204 and a second opening 206, which may be located at opposite ends of enclosure 202. Each of the openings 204 and 206 may allow cameras to define a first field of view 120 and a second field of view 122, which may create an overall field of view 124 shown in FIG. 1. LED lights 208 and 210 may be located at each end of enclosure 202 as well. Scanner bar 112 may also include one or more illumination lights 212 and 214. Illumination lights 212 and 214 may be used to illuminate field of view 124.

As shown in FIG. 2A, enclosure 202A may be a single component that may define openings 204 and 206 as well as house cameras and support lighting elements. As shown in FIG. 2B, enclosure 202B may be multiple components that each may define an opening and house a camera and supporting lighting elements. Each of enclosures 202B shown in FIG. 2B may be the same such that two enclosures 202B may be used to create an enclosure that is similar to enclosure 202A shown in FIG. 2A.

By having two enclosures, enclosures 202B, scanner bar 112 may be modular. The modular design may allow for multiple enclosures to be used to create scanner bar 112. For example, four enclosures could be used and each enclosure located at a corner of a cube configuration. As a result, cameras could be located both below and above the field of view defined by the cameras. Cameras located at each of the corners of the cube and arranged towards a center of the cube could allow a user to pass a product through the field of view without having to worry about orienting a barcode or other identifying features of the product towards cameras.

When various enclosures are used to create scanner bar 112, the various enclosures may be connected to each other and/or computing device 114 via wired or wireless connections. For example, each of the various enclosures may be hardwired to computing device 114 such that images capture by cameras and signals used to activate lights can be transmitted to from computing device 114 to the various enclosures via wires. In other embodiments, each of the enclosures may include a transceiver that allows for images captured by the cameras and signals that activate the various lighting elements to be transmitted and received between the enclosure and computing device 114 wirelessly. Non-limiting examples of wireless communication protocols include BLUETOOTH®, WI-FI®, near-field-communication (NFC), etc.

Figure 3A:
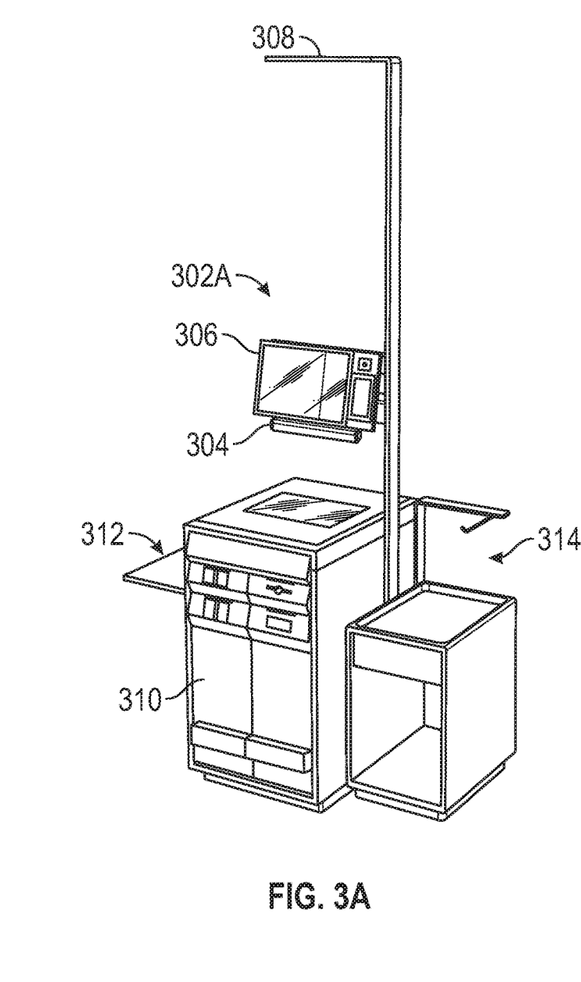
FIGS. 3A, 3B, and 3C show example self-service terminal configurations consistent with this disclosure.
Figure 3B:
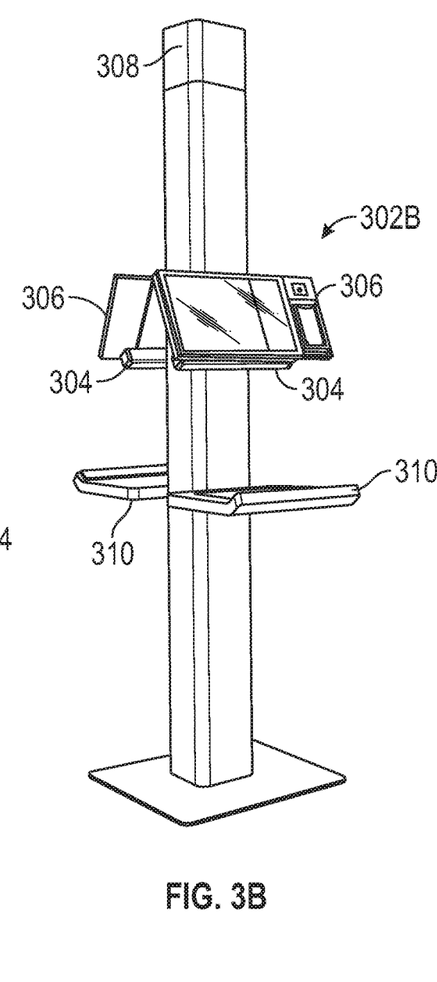
Figure 3C:
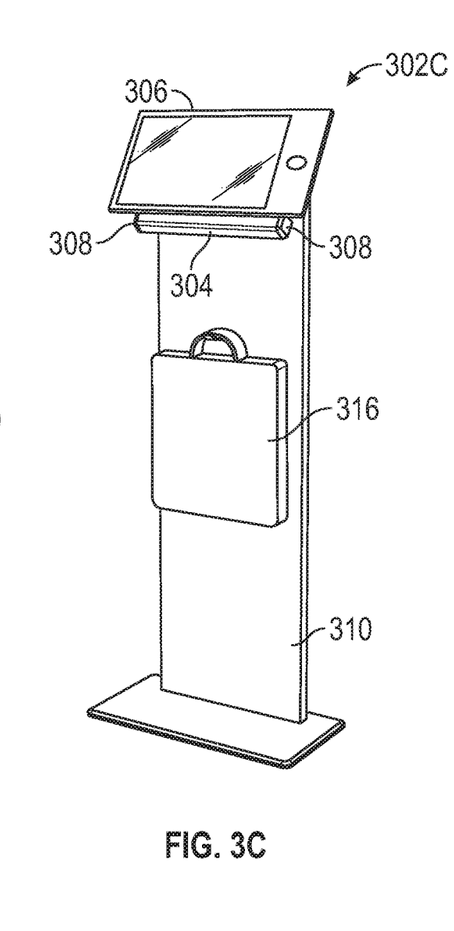

FIGS. 3A, 3B, and 3C show example self-service terminal configurations consistent with this disclosure. FIG. 3A shows a self-service terminal 302A that may include a scanner bar 304 consistent with scanner bars disclosed herein. As shown in FIG. 3A, self-service terminal 302A may include a display/touchscreen 306 to which scanner bar 304 may be attached. Self-service terminal 302A may also include an indicator light 308 that may include LED lights for use in providing visual indications regarding correct scanning of products.

Cameras inside scanner bar 304 may define a field of view that is below scanner bar 304 and above a base 310. As products pass from a staging area 312 to a bagging area 314, the products may be scanned using scanner bar 304 and indicator light 308 may be used to provide an indication to the customer or store personnel that the products are being scanned correctly or incorrectly. If products are scanned incorrectly store personnel may be notified to provide assistance to the customer.

FIG. 3B shows a self-service terminal 302B that may include one or more scanner bars 304 consistent with scanner bars disclosed herein. As shown in FIG. 3B, self-service terminal 302B may include one or more displays/touchscreens 308 to which scanner bars 304 may be attached. Self-service terminal 302B may also include an indicator light 308 that may include LED lights for use in providing visual indications regarding correct scanning of products.

Cameras inside scanner bars 304 may define a field of view that is below scanner bars 304 and above bases 310. As products pass from a staging area (e.g., a cart not shown) to a bagging area (e.g., bags not shown), the products may be scanned using scanner bars 304 and indicator light 308 may be used to provide an indication to the customer or store personnel that the products are being scanned correctly or incorrectly. If products are scanned incorrectly store personnel may be notified to provide assistance to the customer.

FIG. 3C shows a self-service terminal 302C that may include a scanner bar 304 consistent with scanner bars disclosed herein. As shown in FIG. 3C, self-service terminal 302C may include a display/touchscreen 308 to which scanner bar 304 may be attached. Self-service terminal 302C may also include indicator lights 308 that may include LED lights for use in providing visual indications regarding correct scanning of products.

Cameras inside scanner bar 304 may define a field of view that is below scanner bar 304 and proximate a base 310. As products pass from a staging area (e.g., a cart not shown) to a bagging area (e.g., bags 316), the products may be scanned using scanner bar 304 and indicator lights 308 may be used to provide an indication to the customer or store personnel that the products are being scanned correctly or incorrectly. If products are scanned incorrectly store personnel may be notified to provide assistance to the customer. While FIG. 3C shows a single scanner bar 304 and display/touchscreen 306, self-service terminal 302C may include a second scanner bar and display/touchscreen located opposite scanner bar 304 and display touchscreen 306 in a similar fashion as shown in FIG. 3B.

Figure 4:
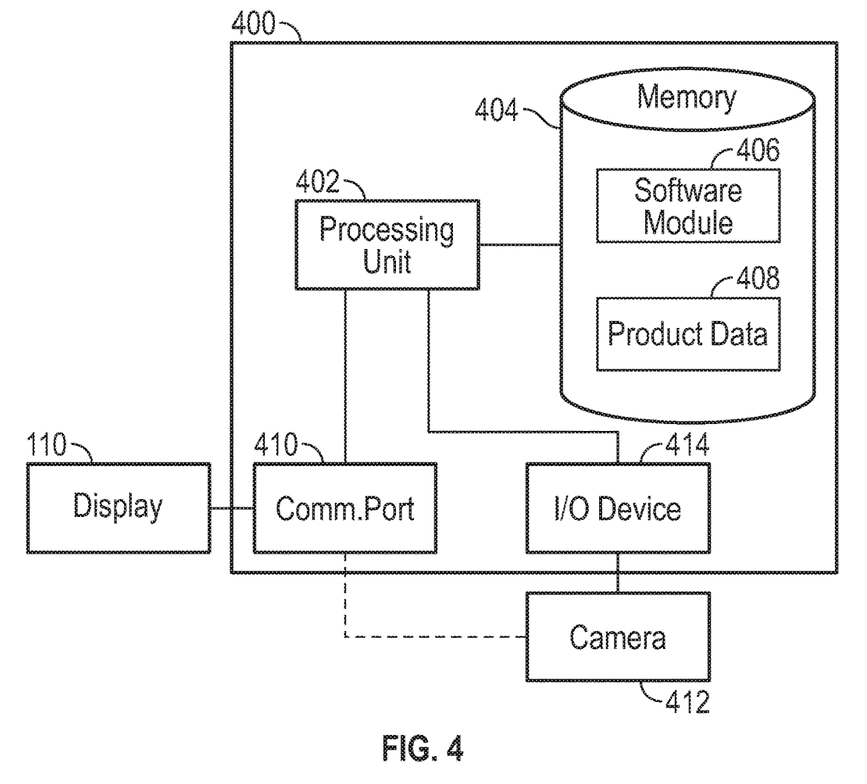
FIG. 4 shows an example schematic of computing device consistent with this disclosure.

FIG. 4 shows an example schematic of a computing device 400, such as computing device 114, consistent with this disclosure. Computing device 400 may include a processing unit 402 and a memory 404. Memory 404 may include a software module 406 and product data 406. While executing on processing unit 402, software module 406 may perform processes for scanning products and object tracking, including, for example, one or more stages included in a method 500 described below with respect to FIG. 5.

As disclosed herein, product data 408 may include data that describes packaging for various products that may be scanned. Non-limiting examples of product data 408 may include a color of packaging, text printed on packaging, barcode data printed on packaging, pricing information for product, pointers that may be used to retrieve product information from a database, etc. The database sorting the product information may be stored locally on memory 404 or remotely on a server and retrieved by computing device 400.

Computing device 400 may also include a communications port 410. Communications port 410 may allow computing device 400 to communicate with various information sources, such as, but not limited to, cameras 412, which may be cameras located inside scanner bars as disclosed herein. As disclosed herein, communications port 410 may allow for wired or wireless connections. Non-limiting examples of communications port 410 include, Ethernet cards (wireless or wired), BLUETOOTH® transmitters, receivers, or transceivers, near-field communications modules, serial port interfaces, etc.

Computing device 400 may also include an input/output (I/O) device 414. I/O device 414 may allow computing device to receive and output information. Non-limiting examples of I/O device 414 include, a camera (still or video), biometric readers, credit card readers, etc. For example, I/O device 414 may include a printer that can be used to print customer receipts, etc.

As disclosed herein, computing device 400 may also be connected to display 110. The connection may be via a communications port, such as communications port 410, a display port, etc. The connection may be wired or wireless. Display 110 may be a touchscreen display and act as an I/O device that allows users to input information or receive information.

Figure 5:
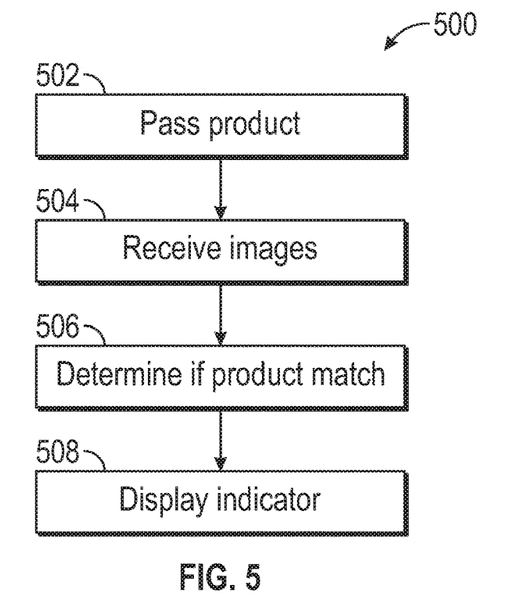
FIG. 5 shows an example method consistent with this disclosure.

FIG. 5 shows an example method 500 consistent with this disclosure. Method 500 may begin at stage 502 where a product may be passed through a field of view. For example, as disclosed herein, a product may be passed from a cart or other staging area through field of view and into a bagging area or returned to the cart.

From stage 502 method 500 may proceed to stage 504 where images may be received. For instance, as disclosed herein, a first camera and a second camera associated with one or more scanning bars may transmit first images and second images to a computing device. The first images may be captured in a first field of view and the second images may be captured in a second field of view. The first and second fields of view may overlap to form an overall field of view.

From stage 504 method 500 may proceed to stage 506 where a determination may be made as to if a product in the first images matches a product in the second images. For example, to prevent users from scanning a cheaper product and placing a more expensive product in the bagging area, the product may be tracked using the image. For instance, as disclosed herein, one or more properties of the product may be identified in the first images and compared to one or more properties of a product identified in the second images.

As an example, properties such as dimensions of the product, packaging color, text printed on the package, etc. may be identified from the first images. The same properties may or may not be identified from the second images. If the same properties are identified, then the determination may be that the product contained in the first images is the same as the product contained in the second images. Stated another way, the product the user initially scanned was not replaced or otherwise altered and is the product the user places in the bagging area.

As disclosed herein, making the determination does not require complex image analysis because the properties from the first image are not being matched to products in a database or other data repository to identify what the product is. As disclosed herein, the true identity of the product is not important for the determination stage. All the determination stage is attempting to do is determine if a product in the first image is the same product in the second images.

As disclosed herein, the images received may be still images or video images. For example, the cameras may capture video and using object tracking within the video images to follow the product as it travels from the staging area through the field of view and into the bagging area.

From stage 506 method 500 may proceed to stage 508 where an indication may be displayed. As disclosed herein, the indication may allow the user of the self-service terminal or other store personnel to know if the product that was taken from the cart or staging area and passed through the field of view and into the bagging area or back into the cart is the same product. For example, when the product in the first images matches the product in the second images, a green light may be displayed and when the product in the first images does not match the product in the second images a red light may be displayed.

EXAMPLES

Example 1 is a scanner comprising: an enclosure defining a first opening and a second opening; a first camera arranged to capture first images exterior to the enclosure via the first opening; and a second camera arranged to capture second images exterior to the enclosure via the second opening, wherein the first images and the second images are of a product passing through a field of view defined by the first camera and the second camera.

In Example 2, the subject matter of Example 1 optionally includes wherein the field of view is a continuous field of view.

In Example 3, the subject matter of any one or more of Examples 1-2 optionally include wherein the field of view is composed of a first field of view for the first camera that overlaps a second field of view for the second camera.

In Example 4, the subject matter of any one or more of Examples 1-3 optionally include wherein first opening and the second opening are located at opposite ends of the enclosure.

In Example 5, the subject matter of any one or more of Examples 1-4 optionally include a first indicator light located at a first end of the enclosure; and a second indicator light located at a second end of the enclosure, the first and second indicator lights each configured to display a first color when the product correctly scans and a second color when the product does not correctly scan.

In Example 6, the subject matter of any one or more of Examples 1-5 optionally include wherein the enclosure defines a connection such that the enclosure is divided into a first part that defines the first opening and a second part that defines the second opening.

In Example 7, the subject matter of any one or more of Examples 1-6 optionally include wherein the scanner is a component of a self-service terminal or a portable scanning device.

Example 8 is a self-service terminal comprising: a scanner comprising: an enclosure defining a first opening and a second opening, a first camera arranged to capture first images exterior to the enclosure via the first opening, the first camera having a first field of view, and a second camera arranged to capture second images exterior to the enclosure via the second opening, the second camera having a second field of view; a processor electrically coupled to the first camera and the second camera; and a memory storing instructions that, when executed by the processor, cause the processor to: receive the first images from the first camera, receive the second images from the second camera, and determine, using the first images and the second images, if a first product in the first images and a second product in the second images are the same product.

In Example 9, the subject matter of Example 8 optionally includes wherein a portion of the first field of view overlaps a portion of the second field of view.

In Example 10, the subject matter of any one or more of Examples 8-9 optionally include wherein determining that a first product in the first images and a second product in the second images are the same product includes instructions that, when executed by the processor, cause the processor to perform an image tracking procedure.

In Example 11, the subject matter of any one or more of Examples 8-10 optionally include wherein determining that a first product in the first images and a second product in the second images are the same product includes instructions that, when executed by the processor, cause the processor to determine a property of the first product in the first images matches a property of the second product in the second images.

In Example 12, the subject matter of Example 11 optionally includes wherein the property includes at least one of a color of packaging, text printed on the packaging, and a barcode printed on the packaging.

In Example 13, the subject matter of any one or more of Examples 8-12 optionally include wherein the scanner is located in a fixed position such that the first camera and the second camera are located above first field of view and the second field of view.

In Example 14, the subject matter of any one or more of Examples 8-13 optionally include wherein the scanner is a handheld component and movable about the self-service terminal.

In Example 15, the subject matter of any one or more of Examples 8-14 optionally include wherein first opening and the second opening are located at opposite ends of the enclosure.

In Example 16, the subject matter of any one or more of Examples 8-15 optionally include a first indicator light electrically coupled to the processor and located at a first end of the enclosure; and a second indicator light electrically coupled to the processor and located at a second end of the enclosure, the first and second indicator lights each configured to: display a first color when the first product in the first images and the second product in the second images are the same product, and display a second color when the first product in the first images and the second product in the second images are not the same product.

Example 17 is a method comprising: passing a product through a field of view defined by a first camera and a second camera; receiving, at a computing device comprising a processor, first images from the first camera; receiving, at the computing device, second images from the second camera; and determining, by the computing device using the first images and the second images, if a first product in the first images and a second product in the second images are the product passed through the field of view.

In Example 18, the subject matter of Example 17 optionally includes wherein determining if the first product and the second product are the product includes performing an image tracking procedure.

In Example 19, the subject matter of any one or more of Examples 17-18 optionally include wherein determining if the first product and the second product are the product includes determining if a property of the first product in the first images matches a property of the second product in the second images.

In Example 20, the subject matter of Example 19 optionally includes wherein the property includes at least one of a color of packaging, text printed on the packaging, and a barcode printed on the packaging.

In Example 21, the subject matter of any one or more of Examples 17-20 optionally include wherein passing the product through the field of view includes passing the product under a housing containing the first camera and the second camera.

In Example 22, the subject matter of any one or more of Examples 17-21 optionally include displaying a first color when the first product in the first images and the second product in the second images are the product; and displaying a second color when the first product in the first images and the second product in the second images are not the product.

In Example 23, the scanner, self-service terminal, or method of any one of or any combination of Examples 1-22 is optionally configured such that all elements or options recited are available to use or select from.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A scanner comprising:
   a processing unit; and
   a plurality of enclosures, each of the enclosures defining a first opening and a second opening, each of the plurality of enclosures including:
      a first camera arranged to capture first images exterior to the enclosure via the first opening,
      a second camera arranged to capture second images exterior to the enclosure via the second opening, and
      a transceiver configured to allow each of the each of the plurality of enclosures to communicate with each other and the processing unit,
   wherein the first images and the second images are of a product passing through a field of view defined by the first camera and the second camera of each of the plurality of enclosures.

2. The scanner of claim 1, wherein the field of view is a continuous field of view.

3. The scanner of claim 1, wherein the field of view is composed of a first field of view for the first camera of each of the plurality of enclosures that overlaps a second field of view for the second camera of each of the plurality of enclosures.

4. The scanner of claim 1, wherein first opening and the second opening of at least one of the plurality of enclosures are located at opposite ends of the enclosure.

5. The scanner of claim 1, wherein at least one of the plurality of enclosures includes:
   a first indicator light located at a first end of the at least one of the plurality of enclosures; and
   a second indicator light located at a second end of the at least one of the plurality of enclosures,
   the first and second indicator lights each configured to display a first color when the product correctly scans and a second color when the product does not correctly scan,
   wherein the first and second indicator lights are visible to a customer and store personnel.

6. The scanner of claim 1, wherein at least one of the plurality of enclosures defines a connection such that the enclosure is divided into a first part that defines the first opening and a second part that defines the second opening.

7. The scanner of claim 1, wherein the scanner is a component of a self-service terminal or a portable scanning device.

8. A self-service terminal comprising:
a processor;
a scanner comprising:
a plurality of enclosures, each of the enclosures defining a first opening and a second opening, each of the plurality of enclosures including:
a first camera arranged to capture first images exterior to the enclosure via the first opening,
a second camera arranged to capture second images exterior to the enclosure via the second opening, and
a transceiver configured to allow each of the each of the plurality of enclosures to communicate with each other and the processing unit; and
a memory storing instructions that, when executed by the processor, cause the processor to:
receive the first images from the first camera via the transceiver,
receive the second images from the second camera via the transceiver, and
determine, using the first images and the second images, if a first product in the first images and a second product in the second images are the same product.

9. The self-service terminal of claim 8, wherein determining that a first product in the first images and a second product in the second images are the same product includes instructions that, when executed by the processor, cause the processor to perform an image tracking procedure.

10. The self-service terminal of claim 8, wherein determining that a first product in the first images and a second product in the second images are the same product includes instructions that, when executed by the processor, cause the processor to determine a property of the first product in the first images matches a property of the second product in the second images.

11. The self-service terminal of claim 10, wherein the property includes at least one of a color of packaging, text printed on the packaging, and a barcode printed on the packaging.

12. The self-service terminal of claim 8, wherein the scanner is located in a fixed position such that the first camera and the second camera are located above a first field of view and a second field of view.

13. The self-service terminal of claim 8, wherein the scanner is a handheld component and movable about the self-service terminal.

14. The self-service terminal of claim 8, wherein the first opening and the second opening are located at opposite ends of a respective one of the plurality of enclosures.

* * * * *